United States Patent [19]

Bridges

[11] Patent Number: 5,362,107
[45] Date of Patent: * Nov. 8, 1994

[54] PIPE COUPLING WITH SEALING PLATE

[76] Inventor: Donald Y. Bridges, 3014 Creek Ct., Roswell, Ga. 30075

[*] Notice: The portion of the term of this patent subsequent to Feb. 15, 2011 has been disclaimed.

[21] Appl. No.: 215,499

[22] Filed: Mar. 21, 1994

Related U.S. Application Data

[63] Continuation of Ser. No. 978,770, Nov. 9, 1992, Pat. No. 5,295,716, which is a continuation-in-part of Ser. No. 861,940, Apr. 2, 1992, Pat. No. 5,286,064.

[51] Int. Cl.$^5$ .............................................. F16L 55/18
[52] U.S. Cl. .................................... 285/15; 285/373; 285/419; 285/910; 138/97
[58] Field of Search ................. 285/15, 373, 419, 910; 137/99, 97

[56] References Cited

U.S. PATENT DOCUMENTS

| | | |
|---|---|---|
| 1,059,592 | 4/1913 | Byers . |
| 1,607,943 | 11/1926 | Carson et al. . |
| 1,790,957 | 2/1931 | Sykes . |
| 2,245,153 | 6/1941 | McWane . |
| 2,849,244 | 8/1958 | Sampson . |
| 2,913,262 | 11/1959 | DeCenzo et al. . |
| 3,153,550 | 10/1964 | Hollett . |
| 3,479,066 | 11/1969 | Gittleman . |
| 3,712,631 | 1/1973 | Forchini et al. . |
| 3,823,216 | 7/1974 | Petzetakis . |
| 4,108,481 | 8/1978 | Graham . |
| 4,172,607 | 10/1979 | Norton . |
| 4,303,103 | 12/1981 | Marks et al. . |
| 4,360,227 | 11/1982 | Bridges . |
| 4,583,770 | 4/1986 | Kreku et al. . |
| 4,652,023 | 3/1987 | Timmons . |
| 4,653,782 | 3/1987 | Munday . |
| 4,664,428 | 5/1987 | Bridges . |
| 4,944,498 | 7/1990 | Kortgen et al. . |
| 5,076,618 | 12/1991 | Bridges . |
| 5,086,809 | 2/1992 | Bridges . |

FOREIGN PATENT DOCUMENTS

| | | |
|---|---|---|
| 227512 | 1/1959 | Australia . |
| 3017632 | 11/1981 | Germany . |
| 763665 | 12/1956 | United Kingdom . |
| 790109 | 2/1958 | United Kingdom . |

OTHER PUBLICATIONS

Brico Industries, "Depend-O-Lok Mechanical Coupling Systems" brochure Rev. Jun. 1989, Atlanta GA.

Primary Examiner—Randolph A. Reese
Assistant Examiner—Heather Chun Shackelford
Attorney, Agent, or Firm—Jones & Askew

[57] ABSTRACT

A one-piece pipe coupling includes a cylinder with an axial joint and a sealing plate attached in spaced apart relation to the inner surface of the cylinder with a portion of the sealing plate extending beyond the axial joint for sealing the fluid pathways between a leak location and the outer surface of the coupling. A pair of arcuate gaskets extend around and are attached to the inner surface of the cylinder. The sealing plate carries a first sealing pad on the extending portion of its outer surface, which sealing pad includes circumferential guide channels for engaging the arcuate gaskets of the cylinder. The sealing plate also carries a second sealing pad on the other end of its outer surface, which sealing pad attaches the sealing plate in spaced apart relation to the inner surface of the cylinder. Further, the sealing plate carries circumferential sealing pad material on its inner surface to engage the arcuate gaskets attached to the inner surface of the cylinder, thereby forming a sealing connection around the pipe by the arcuate gaskets and the circumferential sealing pad material, and along both of the axial pads.

5 Claims, 4 Drawing Sheets

Fig_1

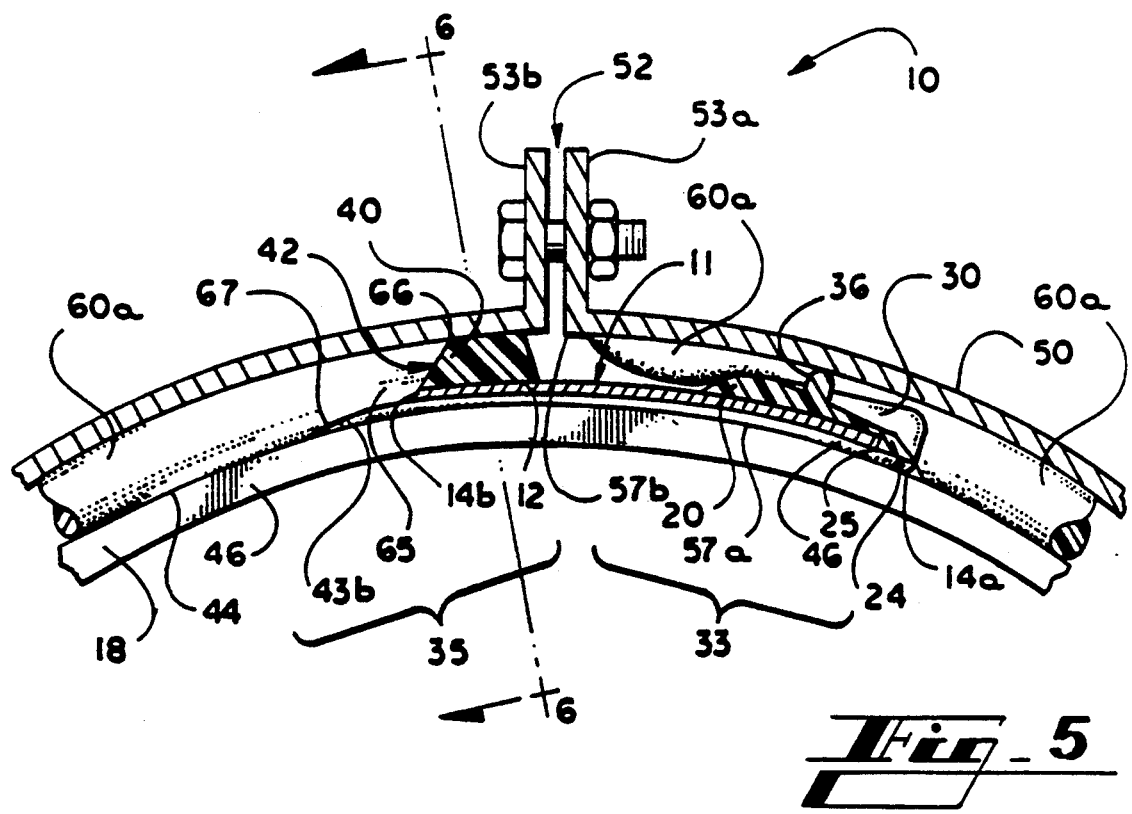
Fig_5
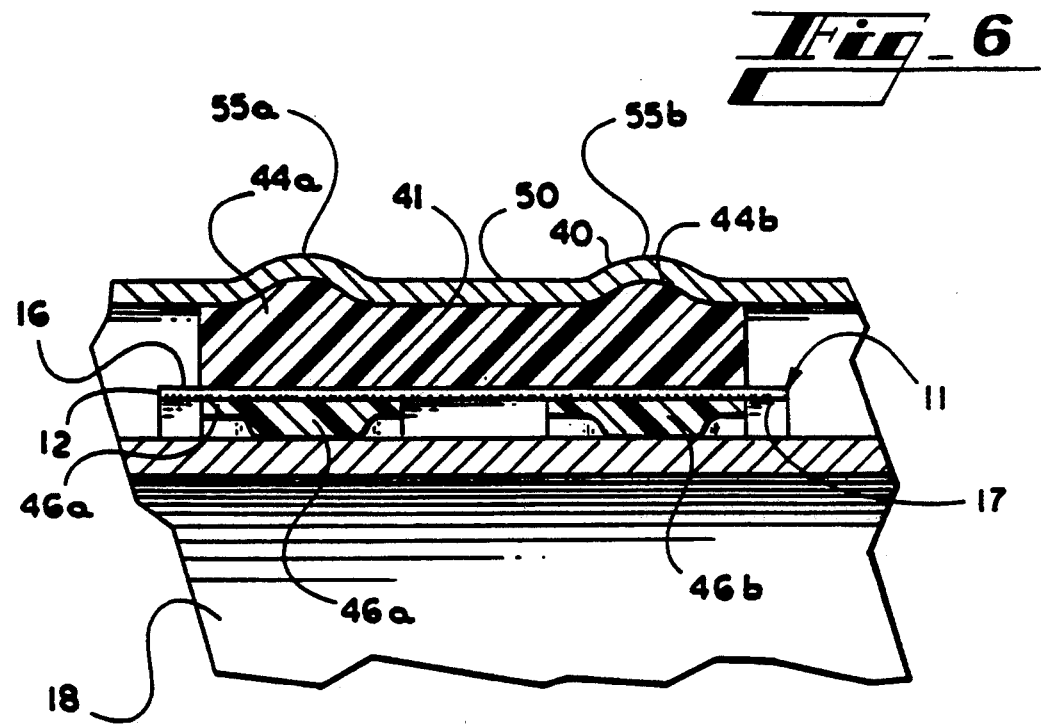
Fig_6

PIPE COUPLING WITH SEALING PLATE

CROSS REFERENCE TO RELATED APPLICATION

This application is a continuation of U.S. application Ser. No. 07/978,770, filed Nov. 19, 1992, entitled "Pipe coupling with Sealing Plate" now issued as U.S. Pat. No. 5,295,716, which is a continuation-in-part of U.S. application Ser. No. 07/861,940 filed Apr. 2, 1992, entitled "Sealing Plate for a Pipe Coupling" now issued as U.S. Pat. No. 5,286,064.

TECHNICAL FIELD

The present invention relates to couplings for sealing leak locations in pipes and pipelines including joints between adjacent pipe ends, and particularly relates to a pipe coupling with a sealing plate for use in sealing the axial joint of the pipe coupling.

BACKGROUND OF THE INVENTION

The sealing of pipe joints and other leak locations in pipes and pipelines is a critical concern, and proper sealing has become more important as efforts have increased to protect the environment. Liquid chemicals, sewage, toxic gases, and other fluid-like materials such as fine dust must be conducted through pipelines without leakage of the material from the pipeline and without contamination from outside. To seal pipe joints, pipeline installers typically encircle the joint with a cylindrical coupling consisting of either two semi-cylindrical pieces fastened together to clamp the pipe ends, or a single cylindrical piece having an axial slit which allows the coupling to be opened by an amount sufficient to fit over the pipe ends.

Annular gasket members, such as O-rings, may be placed around the pipe ends beneath the coupling to block the escape of fluid axially between the coupling and the pipe ends, but it is then necessary to block escape of fluid outwardly through the axial slit of the coupling. Several prior devices for this purpose have been developed, as described in U.S. Pat. Nos. 4,360,227; 1,607,943; 2,913,262; 3,153,550; 4,664,428, and 5,086,809.

U.S. Pat. No. 4,664,428, which is incorporated herein by reference in its entirety, describes a sealing plate spanning the axial slit of a coupling and contacting two O-rings positioned on opposite sides of the joint in the pipeline. The sealing plate is positioned outside the O-rings, but between the O-rings and the coupling. The sealing plate has axial gaskets along its edges for preventing passage of fluid from between the O-rings to the outer surface of the sealing plate. This sealing plate has the disadvantage, however, that it can only be used with continuous annular O-rings which must be properly positioned on the pipe ends before positioning the sealing plate over the O-rings and then positioning the coupling over the sealing plate and O-rings. Placing O-rings around pipe ends may be difficult if there is insufficient room to maneuver the O-rings onto the pipe ends. Another disadvantage is that couplings having arcuate gasket members attached to the inside of the coupling cannot be used with such a sealing plate. In addition, during the positioning and tightening of the coupling, the O-rings may become misaligned or the sealing plate may become misaligned with respect to the O-rings.

U.S. Pat. No. 4,664,428 also describes a sealing gasket extending along an axial edge of the coupling so that the gasket is positioned between the axial edge and the inner surface of the coupling when the coupling is fixed around the pipe. Both approaches described in U.S. Pat. No. 4,664,428 have the disadvantage that in fitting the pipe coupling over the O-rings and other gaskets, the O-rings may buckle, deform, or be displaced, thereby allowing leakage. These problems in installation are particularly difficult when couplings are being placed underwater by divers, in confined areas, in open trenches or channels containing flowing water, or on existing pipelines to repair a joint or leak.

Thus, there is a need in the art for a pipe coupling that reliably seals all fluid paths from the interior of the pipe sections to the exterior of the pipe coupling. In addition, there is a need for a pipe coupling that can be installed reliably and conveniently in awkward situations. The inventions in my copending application, Ser. No. 861,940 filed Apr. 2, 1992, entitled "Sealing Plate for a Pipe Coupling", have the disadvantage of a sealing plate which is a separate piece from the pipe coupling. The sealing plate must be placed first in proper position across the axial position of the leak location, and then the pipe coupling is closed around a pair of arcuate gaskets so, that the arcuate gaskets engage the sealing pads of the sealing plate. Therefore, there is also a need in the art for a pipe coupling that is of one-piece construction and that provides ease of installation as well as sealing connections.

SUMMARY OF THE INVENTION

The present invention solves the above problems in the art by providing a one-piece pipe coupling. The present invention provides a cylindrical coupling member, a sealing plate, and gasket segments as a single unit. The present invention is easily installed in a few steps without expensive equipment or a high degree of skill. No separate O-rings need to be installed around the pipe ends.

Generally described, the present invention provides an apparatus for sealing a leak location in a pipe, comprising a cylinder with an inner surface and an outer surface and with an axial joint defined by a first axial edge and a second axial edge. The apparatus further comprises a sealing plate for preventing passage of fluid to the outer surface of the cylinder. The sealing plate is attached to the cylinder in spaced apart relation by an axial sealing pad at the axial joint so that the sealing plate extends outwardly from one of the axial edges of the joint. Adjacent to the extending axial plate edge, the sealing plate comprises another outer axial sealing pad adhered to the outer surface of the plate member. This axial sealing pad in the preferred embodiment defines a pair of spaced apart circumferential guide channels, one on each side of the leak location, and a bridging member connecting the guide channels. Further, the sealing plate includes a pair of spaced apart circumferential sealing pads adhering to the inner surface of the sealing plate.

A coupling embodying the present invention also includes a pair of arcuate gaskets attached to an inner surface of the cylinder. Each of the arcuate gaskets extends from the attaching axial sealing pad, around the interior of the cylinder to a position adjacent to the opposite axial edge of the joint. When the coupling is closed, the arcuate gaskets are positioned against the outer axial sealing pad in the guide channels, and also against the circumferential sealing pads. The present invention further comprises an assembly for closing the pipe coupling into a closed configuration such that a sealing connection is formed between each of the circumferential sealing pads and the corresponding arcuate gasket. The axial joint is sealed without deforming the seal provided by the arcuate gaskets positioned between the pipe coupling and the outer surfaces of the pipe.

The present invention also provides a method for sealing a leak location in a pipe comprising the steps of positioning a pipe coupling such as described above around a leak location and closing the pipe coupling with a portion of the inner surface of the cylinder and the arcuate gaskets engaging the extending axial sealing pad such that a sealing connection is formed around the pipe by the arcuate gaskets and corresponding circumferential sealing pads, and along both of the axial pads.

Thus, it is an object of the present invention to provide an improved one-piece pipe coupling.

It is a further object of the present invention to provide an improved method for sealing a leak location in a pipeline.

It is also an object of the present invention to provide a pipe coupling with a sealing plate which is easy to position on a pipeline underwater, in confined areas, in open trenches or channels containing flowing water, or on existing pipelines to repair a joint or leak.

It is yet another object of the present invention to provide an improved sealing assembly of the axial slit of a cylindrical pipe coupling.

It is also an object of the present invention to provide a means to seal the axial joint of a pipe coupling without deforming the seal provided by arcuate gaskets positioned between the pipe coupling and the outer surfaces of the pipe.

Other objects, features, and advantages of the present invention will become apparent upon review of the following detailed description of embodiments of the invention, when taken in conjunction with the accompanying drawing and the appended claims.

BRIEF DESCRIPTION OF THE DRAWINGS

FIG. 4 is a cross-sectional view of an arcuate gasket used in a pipe coupling embodying the invention.

FIG. 5 is a side cross-sectional view of the pipe coupling with sealing plate of FIG. 1, in a closed position relative to a pipe.

FIG. 6 is a cross-sectional view of the pipe coupling of FIG. 5 taken along 6—6.

DETAILED DESCRIPTION

Figure 1:
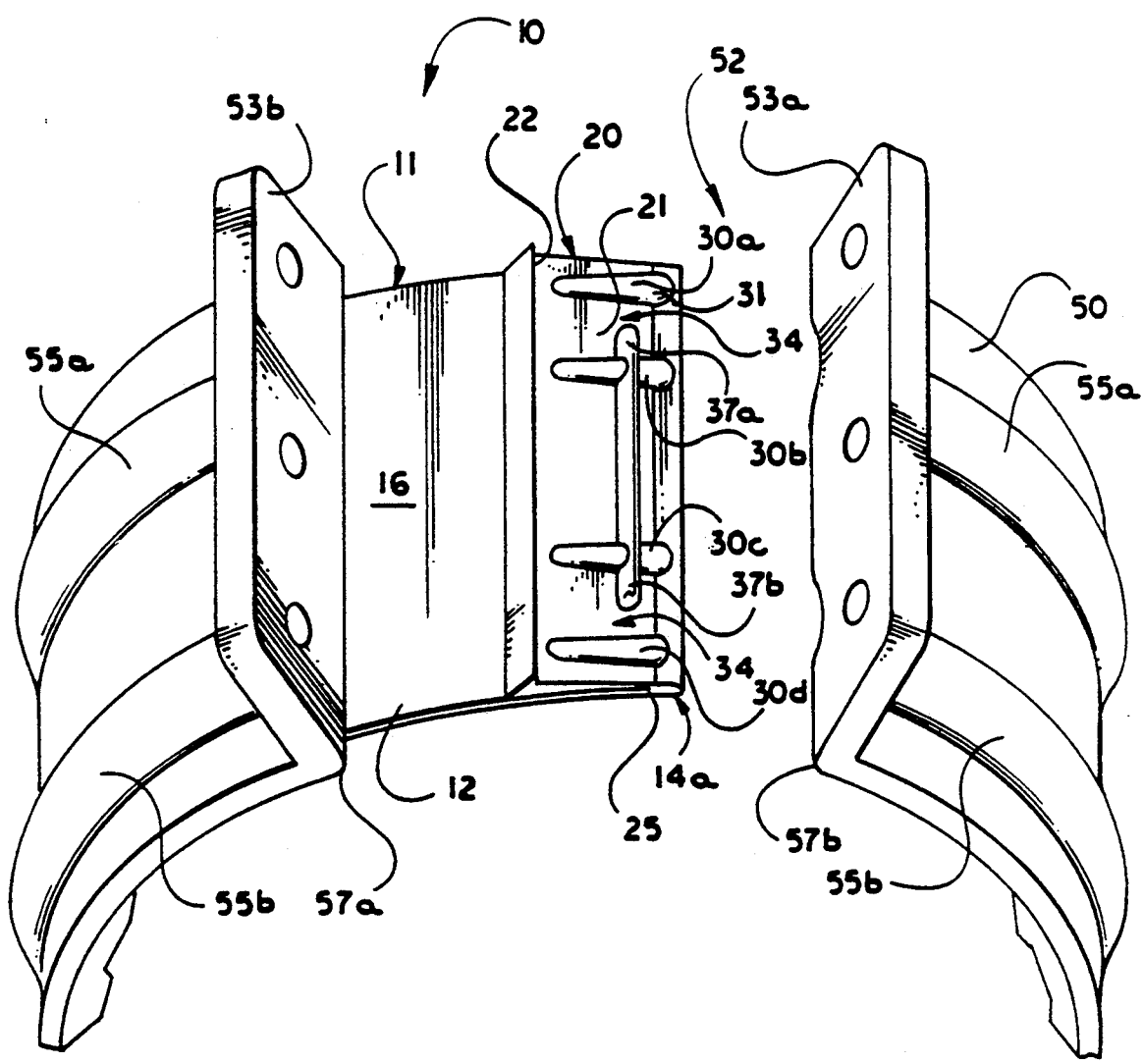
FIG. 1 is a partial pictorial view of the top of the pipe coupling with sealing plate embodying the present invention.

Referring now in more detail to the drawings, in which like numerals refer to like parts throughout the several views, FIG. 1 is a partial pictorial view of the top of a pipe coupling 10 with sealing plate 11 embodying the preferred form of the present invention. Generally, the preferred embodiment comprises a cylinder 50 and an attached sealing plate 11. The cylinder 50 has at least one axial slit 52 defining a first axial edge 57a and a second axial edge 57b. Sealing plate 11 is connected to cylinder 50 in a spaced apart relation to the inner surface of the cylinder adjacent to the first axial edge and so that a portion of sealing plate 11 extends beyond the first axial edge 57a toward the second axial edge 57b.

Cylinder 50 also includes a pair of upstanding clamping flanges 53a, 53b which can be bolted together as shown in FIG. 5 to close the axial slit and thus press the pipe coupling assembly against the outer circumferential surface of a pipe or pipeline. It is often convenient to form the pipe coupling 10 as a pair of semi-circular coupling segments (not shown) so that there are two axial slits requiring two sealing plates 11 to form the pipe joint. Both such joints may be identical to the joint shown in FIGS. 1, 3, and 5.

Figure 2:
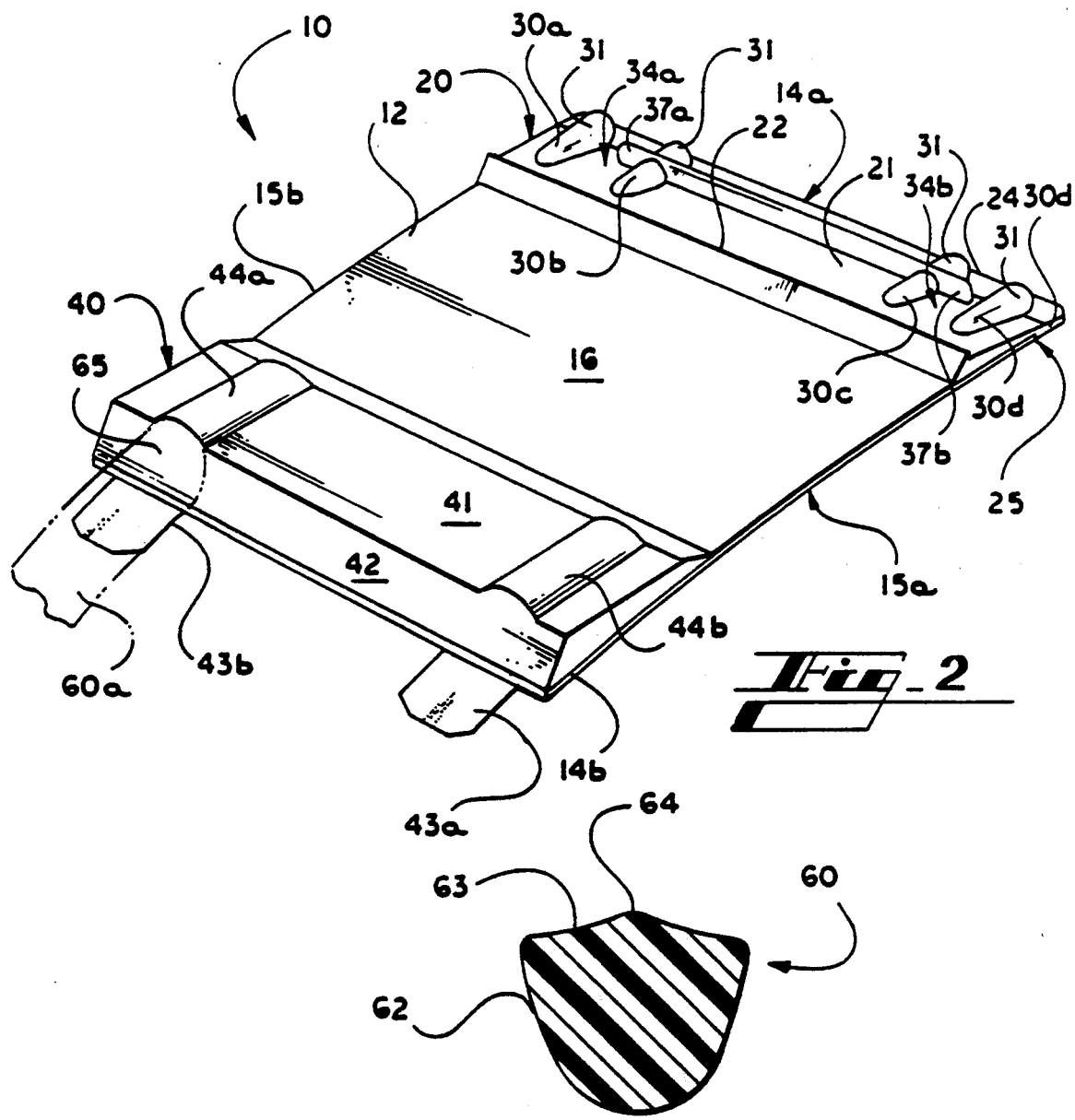
FIG. 2 is a top pictorial view of the sealing plate of the present invention, removed from the coupling.

FIG. 2 illustrates sealing plate 11 in greater detail. Sealing plate 11 includes central plate member 12, preferably made of steel. The rectangular plate member 12 is curved to match the circumference of the pipe or pipeline with which it will be used. The plate member 12 defines a pair of opposing axial plate edges 14a, 14b connected by a pair of opposing circumferential plate edges 15a, 15b. The plate member 12 has an outer surface 16 which faces away from the center of the pipeline when installed, and an inner surface 17, visible in FIG. 3.

Two generally rectangular axial sealing pads 20, 40 are attached to the outer surface 16 of the plate 12. The first axial sealing pad 20 is triangular in cross section. A broad, elongate face 21 of the triangular pad faces the axial plate edge 14a, and an apex ridge 22 is formed at the apex of the triangle. Preferably, the first axial sealing pad 20 extends beyond the axial edge 14a of the plate 12 to form a skirt 24. The skirt extends down over the axial edge 14a at a shoulder 25 formed in the material of the axial plate sealing pad 20.

In the preferred embodiment, the first axial sealing pad 20 also defines a plurality of approximately cone shaped humps 30a, 30b, 30c, 30d which extend circumferentially from a point adjacent to the apex ridge 22 down the broad face 21 and onto the skirt 24, with the base 31 of each cone shaped hump positioned adjacent to the edge of the skirt 24. Two outer humps 30a, 30d shaped as just described, are positioned a short distance inwardly from the circumferential edges 15a, 15b. Two inner humps 30b, 30c are positioned on the first axial sealing pad 20 a short distance inwardly from each of the outer humps 30a, 30d. Preferably each pair of adjacent humps 30a, 30b and 30c, 30d defines a guide channel 34a, 34b, respectively, for receiving an arcuate gasket. The guide channels are spaced apart by the same distance as the arcuate grooves 55a, 55b carrying arcuate gaskets 60a, 60b of cylinder 50 as described below.

On the first axial sealing pad 20, a bridging member 36 connects the guide channels 34. Thus, in the preferred embodiment, a thick axial ridge 36 extends between and connects the inner humps 30b, 30c. The axial ridge 36 must be sufficiently high that a coupling installed over the sealing plate will engage the axial ridge 36 along its entire length. Preferably, the axial ridge 36 has a pair of extensions 37a, 37b, one extending on each end of the axial ridge 36 past the inner humps 30b, 30c into the guide channels 34. The purpose of the extensions 37 is to provide a better engagement between the axial ridge 36a and the arcuate gaskets positioned in the guide channels 34. Those skilled in the art will understand after reviewing the installation of the sealing plate that the material of the skirt 24 between the inner humps 30b, 30c is not required for the sealing function of the sealing plate 11.

In the preferred embodiment, the second axial sealing pad 40 has a generally rectangular top surface 41 defining two humps 44a, 44b shaped to be received within the grooves 55a and 55b. Preferably, the second axial sealing pad extends beyond the second axial plate edge 14b of the plate. A side 42 of the second axial sealing pad 40 adjacent the second axial plate edge 14b is beveled away from the center of the plate.

As noted, the present invention provides the cylinder 50 and sealing plate 11 as a unit. This is accomplished by attaching the sealing plate in a spaced apart relation to the cylinder at one of the axial slits. In the preferred embodiment, the second axial sealing pad 40 is adhered to the inner surface of the cylinder along the first axial edge 57a so that the sealing plate is connected to the cylinder and a portion of the sealing plate extends beyond the first axial edge to a position spaced outwardly from the first axial edge. Preferably, the second axial sealing pad 40 is vulcanized to the inner surface of the cylinder. The attachment of the second sealing pad 40 to the cylinder 50 is further discussed in connection with FIGS. 4 and 5.

Figure 3:
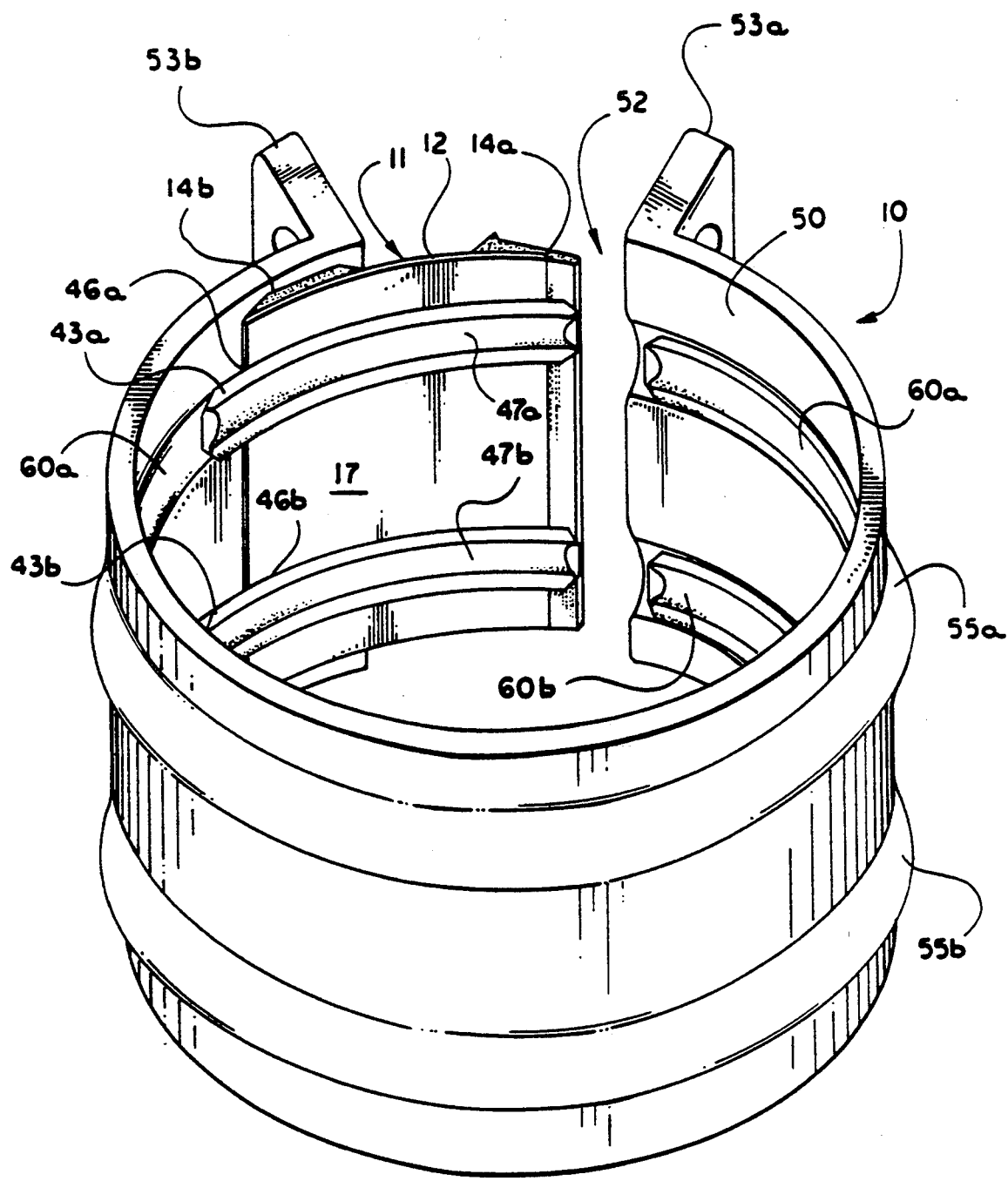
FIG. 3 is a pictorial view of the pipe coupling showing the interior of the sealing plate of FIG. 1.

As shown in FIG. 3, a pair of arcuate grooves 55a, 55b are formed preferably in the inner surface of cylinder 50. In the preferred embodiment, a pair of arcuate gaskets or annular O-ring segments 60a, 60b extend around the interior of the cylinder 50 from a position engaging the sealing plate 11 to a position adjacent to the first axial edge 57a. Preferably, each arcuate gasket 60a, 60b is received and vulcanized into a respective one of the arcuate grooves 55a, 55b. FIG. 4 illustrates a preferred cross section for the gasket material used to form the arcuate gaskets 60a, 60b. The gasket defines a rounded side 62 extending about 240 degrees around the circumference of the gasket material, with the remaining portion 63 being generally flattened. A slight ridge 64 extends outwardly along the center of the flattened portion. The preferred shape as shown in FIG. 4 resembles a medallion or shield. When used as an arcuate gasket in connection with the sealing plate of the present invention, the rounded side 62 is received within the guide channels 34 of the first axial sealing pad 20. The ridge 64 therefore points outwardly to form a tight seal with the surrounding coupling. When used to form arcuate gaskets vulcanized to the interior of the coupling, the flattened portion 63 is received within and vulcanized to the arcuate grooves 55a, 55b of the coupling 50.

Referring again to FIG. 3, the inner surface 17 of plate member 12 of sealing plate 11 has a pair of spaced apart circumferential sealing pads 46a, 46b attached. The two circumferential sealing pads 46a, 46b have extensions 43a, 43b extending past the axial edge 14b and the second axial sealing pad 40, for attachment to both the axial sealing pad 40 and the arcuate gaskets 60a, 60b, respectively. An attachment of extension 43b to arcuate gasket 60a (in phantom) is shown in FIG. 2. The circumferential sealing pads 46a, 46b and extensions 43a, 43b are formed by strips of gasket material molded or extruded with an approximately half-circular central protrusion 47a, 47b at the center of each of the pads 46a, 46b. The central protrusion 47 extends along the length of each pad.

FIG. 5 illustrates in cross section the preferred embodiment of the present invention. The relative size of the elements is exaggerated in order to show detail. Pipe coupling 10 is in a closed or clamped position around a pipe 18. In this position, the first axial plate edge 14a of sealing plate 11 is positioned to extend under the first axial edge 57b of cylinder 50 so that an area of overlap 33 is formed. Preferably, overlap 33 is approximately the same size as the area of overlap 35 formed as a result of the attachment of the second axial sealing pad 40 to the inner surface of cylinder 50 along second axial edge 53b. In this manner, the pipe coupling 10 is placed over the leak location with axial slit 52 positioned over the central area of sealing plate 11.

In other words, the first axial plate edge 14a is positioned adjacent to the inner surface of the cylinder 50 so that the first axial plate edge 14a fits under the arcuate gasket segments 60a, 60b. The arcuate gasket segments 60a, 60b cross the first axial sealing pad 20 in the guide channels 34. The sealing plate is positioned directly on the pipe with the circumferential sealing pads 46, extending parallel and on opposite sides of the leak location. The axial sealing pads 20, 40 extend along the pipe line. Referring to FIGS. 1 and 5, when the coupling 50 is tightened down against the sealing plate, the arcuate gasket material is compressed into the guide channels 34 and comes into engagement with the humps 30. Those skilled in the art will understand that the arcuate gasket segments 60 need only extend to a position between the first sealing pad 20 and the flange 53a. In the preferred embodiment, the arcuate gaskets 60 also engage and compress the extensions 37 of the axial ridge 36. When fully tightened, the coupling 10 between the arcuate gaskets 60 comes into engagement .with the axial ridge 36. At the point where the arcuate gaskets 60 pass over the first axial plate edge 14a of the sealing plate 11, the arcuate gasket 60 are pressed against the skin 24, thereby sealingly engaging the arcuate gaskets with the circumferential sealing pads 46 lying underneath the sealing plate 11.

FIG. 5 also illustrates the cross section of the attachment of the second axial sealing pad 40 to cylinder 50. The top surface 41 of second sealing pad 40 is attached to the inner surface of the cylinder along the second axial edge 57a by a process of vulcanization. In FIG. 6, it may be seen that the second sealing pad 40 connects the sealing plate in a spaced apart relation to cylinder 50. As noted, the top surface 41 of second sealing pad 40 is vulcanized to cylinder 50. The second sealing pad is attached to the upper surface 16 of the sealing plate 11. The pair of circumferential gaskets 46a, 46b are disposed on the underside 17 of the sealing plate 11. The circumferential gaskets are also disposed on the pipe 18 on either side of the leak location. Thus, the positioning of the cylinder 50, second sealing pad 40, sealing plate 11 and circumferential gaskets 46a, 46b around the pipe seals the axial joint. The height of the second sealing pad 40 serves to maintain the second sealing pad and cylinder in a spaced apart connection so that the distance between the cylinder and the pipe is uniform around the circumference of the pipe. Maintaining uniformity of spacing prevents uneven pressure on the arcuate gaskets and avoids deforming the seal provided.

In addition, the second axial gasket 40 is attached to each of the arcuate gaskets 60a, 60b. FIG. 5 illustrates that in the preferred embodiment the beveled side face 42 of the second axial sealing pad 40 is attached preferably in mating engagement to the end 65 of arcuate gasket 60a, which is beveled away from its leading edge 66. Further, the underside 67 of arcuate gasket 60a adjacent its beveled leading edge 66 is connected to extension 43b of circumferential sealing pad 46. Thus, a sealing connection is made between the arcuate gaskets and the top surface 16 of sealing plate 11 through the sealing pad 40 as well as the bottom surface 17 through the extensions 43a, 43b.

In contrast to prior sealing plates for this type of application, the sealing plate 11 according to the present invention is effectively under the arcuate gaskets which surround the leak location. In this configuration, the unitary construction of the pipe coupling provides for ease of installation. There is no tendency of the arcuate gaskets and the sealing plate to become misaligned with respect to the cylinder 50 during the positioning and tightening of the coupling.

Preferably, the arcuate gaskets or gasket segments 60a, 60b are annular O-ring segments. The term O-ring is used herein to include arcuate gaskets having various cross sections, with a preferred shape being shown in FIG. 4. The axial and circumferential sealing pads, as well as O-ring segments and arcuate gaskets described herein, are preferably made of rubber having a hardness of 40 to 70 Durometer. The axial sealing pads are adhered to the metal plate 12 and to the coupling cylinder 50 preferably by a well known chemical vulcanization process. The axial and circumferential sealing pads are adhered to one another and to the arcuate gaskets 60 preferably by a conventional vulcanization process, which may be a heat/pressure vulcanization process.

It may be seen from the foregoing description that a pipe coupling embodying the present invention differs in significant respects from prior pipe couplings and provides significant advantages. The present pipe coupling 10 is of one-piece construction with one end of the sealing plate 11 attached in a spaced apart relation to the cylinder 50. The extending end of the sealing plate 11 is placed under the arcuate gaskets 60a, 60b so that the circumferential seal is transferred from the arcuate gaskets to the circumferential sealing pads 46, while axial ridge 36 completes the sealing of the axial slit of the coupling. When used with a cylinder having O-ring segments bonded to the interior thereof, the sealing plate simplifies installation which consists of placing the coupling around the pipe with the sealing plate over the leak location, and tightening the coupling. In the preferred embodiment, this process effectively aligns the O-ring segments in the guide channels of the sealing plate. These advantages greatly facilitate convenient and accurate installation of pipe couplings, particularly in situations where access to the leak location or joint is difficult and where the location is surrounded by water.

While this invention has been described in detail with particular reference to preferred embodiments thereof, it will be understood that variations and modifications can be effected within the spirit and scope of the invention as described hereinbefore and as defined in the appended claims.

I claim:

1. A sealing plate for use with a pipe coupling surrounding a leak location in a pipeline, comprising:
   a plate having a pair of axial edges along opposite ends of said plate and a pair of side edges along opposite sides of said plate;
   a pair of axial sealing pads, one adhered to an outer surface of said plate along each of said axial edges, at least one of said axial sealing pads defining a pair of spaced apart circumferential channels therein and a bridging member connecting said channels, said bridging member shaped to be engaged by an inner surface of said pipe coupling when said inner surface is pressed toward the outer surface of said plate; and
   circumferential sealing pad material adhered to an inner surface of said plate and positioned to engage said pipeline on both sides of said leak location.

2. The sealing plate of claim 1, wherein said one axial sealing pad defining said pair of spaced apart circumferential channels extends beyond at least one of said axial edges at the location of said channels and said circumferential sealing pad material extends beyond said axial edge and is attached to said one axial sealing pad.

3. A pipe joint for sealing a leak location in a pipeline, comprising:
   a sealing plate spanning the axial position of said leak location and comprising:
   a plate member having a pair of axial edges along opposite ends of said plate member and a pair of side edges along opposite sides of said plate member,
   a pair of axial sealing pads, one adhered to an outer surface of said plate member along each of said axial edges, at least one of said axial sealing pads defining
   a pair of spaced apart circumferential channels, one on each side of said leak location, said pad extending beyond each of said axial edges at the location of said channels; and
   a bridging member of said pad connecting said channels; and
   circumferential sealing pad material adhered to an inner surface of said plate member and positioned to engage said pipeline on both sides of said leak location, said circumferential sealing pad material extending beyond said axial edge and being attached to said one axial sealing pad;
   a pair of arcuate gaskets positioned around said pipeline one on each side of said leak location, each of said arcuate gaskets engaging both of axial sealing pads in respective channels; and
   an annular coupling having at least one axial joint, said coupling being positioned around said arcuate gaskets with said axial joint positioned over said sealing plate, said coupling being closable to engage an inner surface of said coupling with said gaskets and with said bridging members, and to engage said circumferential sealing pad material with said pipeline.

4. A pipe coupling for sealing a leak location in a pipe, comprising:
   a cylindrical member having an inner surface and an outer surface, and including an axial joint defined by a first axial edge and a second axial edge;
   a sealing plate comprising a plate member having a first axial plate edge and a second axial plate edge along opposite ends of said plate member;
   a first axial sealing pad adhered to an outer surface of said plate member along said first axial plate edge;
   said sealing plate attached in spaced apart relation to said inner surface of said cylindrical member adjacent to said first axial joint edge by a second axial sealing pad adhered to said outer surface of said plate member along said second axial plate edge, and with a portion of said sealing plate extending beyond said first axial joint edge of said cylindrical member to a position spaced outwardly from said first axial joint edge;

circumferential sealing pad material adhering to an inner surface of said plate member and positioned to engage said pipe on both sides of said leak location;

a pair of arcuate gaskets attached to an inner surface of said cylindrical member, each of said arcuate gaskets engaging said second axial sealing pad and said circumferential sealing pad material, and extending around said cylindrical member to a position adjacent to said first axial joint edge of said cylindrical member; and means for closing said pipe coupling with a portion of said inner surface of said cylindrical member and said arcuate gaskets adjacent said first axial joint edge engaging said first axial sealing pad, sealing connections being formed around said pipe by said arcuate gaskets and said circumferential sealing pad material, and along both of said axial sealing pads.

5. The pipe coupling of claim 4, wherein said first axial sealing pad extends beyond said first axial plate edge at the location of said channels, and said circumferential sealing pad material extends beyond said first axial plate edge and is attached to said first axial sealing pad.

* * * * *